United States Patent [19]

Robert et al.

[11] 4,171,908

[45] Oct. 23, 1979

[54] AUTOMATIC TWO WAVELENGTH PHOTOELASTICIMETER

[75] Inventors: Andre J. Robert, Paris; Claude G. Bourdon, Igny; Nessim H. C. Msika, Joliot Curie, all of France

[73] Assignee: Etat Francais represente par le Delegue General pour l'Armement, Paris, France

[21] Appl. No.: 782,342

[22] Filed: Mar. 29, 1977

[30] Foreign Application Priority Data

Apr. 9, 1976 [FR] France .............................. 76 10380

[51] Int. Cl.² .......................... G01B 11/18; G01J 4/00
[52] U.S. Cl. ...................................... 356/33; 73/800; 250/225; 356/366
[58] Field of Search ................... 356/33, 35, 114, 115, 356/116, 364, 365, 366, 367; 250/225; 73/88 A, 800

[56] References Cited

U.S. PATENT DOCUMENTS 3,902,805 9/1975 Redner .................................. 356/33

OTHER PUBLICATIONS

"New Automatic Polariscope System", Redner, Experimental Mechanics, Dec. 1974, pp. 486-491, vol. 14 #12.

Primary Examiner—Vincent P. McGraw
Attorney, Agent, or Firm—Stevens, Davis, Miller & Mosher

[57] ABSTRACT

An automatic two wavelength photoelasticimeter comprising, in succession, a light source for emitting light having at least two wavelengths, $\lambda_1$ and $\lambda_2$; a polarizer rotating at constant speed, an orientable quarter-wave plate of orientation $\beta$ with respect to a reference axis; a model to be analyzed exhibiting double-refraction and having a fast axis which forms an angle $\theta$ with respect to the reference axis and which provides a phase shift $\phi$ (which parameters $\theta$ and $\phi$ are to be measured) and three photodetectors 5, 6, and 7 preceded by analyzers 10, 11 and 12 respectively. The photodetectors 6 and 7 are preceded by filters 8 and 9 of wavelengths $\lambda_1$ and $\lambda_2$ respectively. The difference between the phases of the signals of the frequency $2\omega$ at the outputs of the photodetectors 6 and 7 supplies the difference between the phase shifts contributed by the model from these two wavelengths, the quarter-wave plate being oriented along the bisectors of the axes of double refraction of the model at the point in question. The apparatus is applicable to photoelasticimetry on strongly photoelastic materials and materiasl under high stress.

5 Claims, 6 Drawing Figures

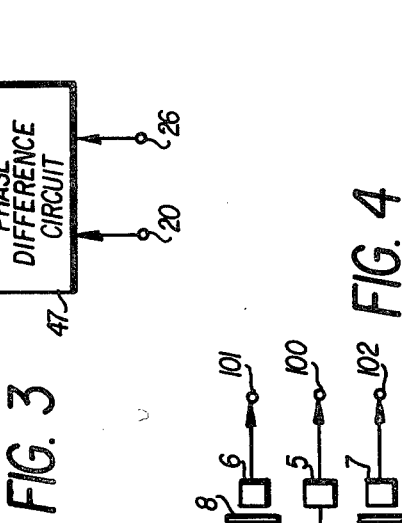
FIG. 3
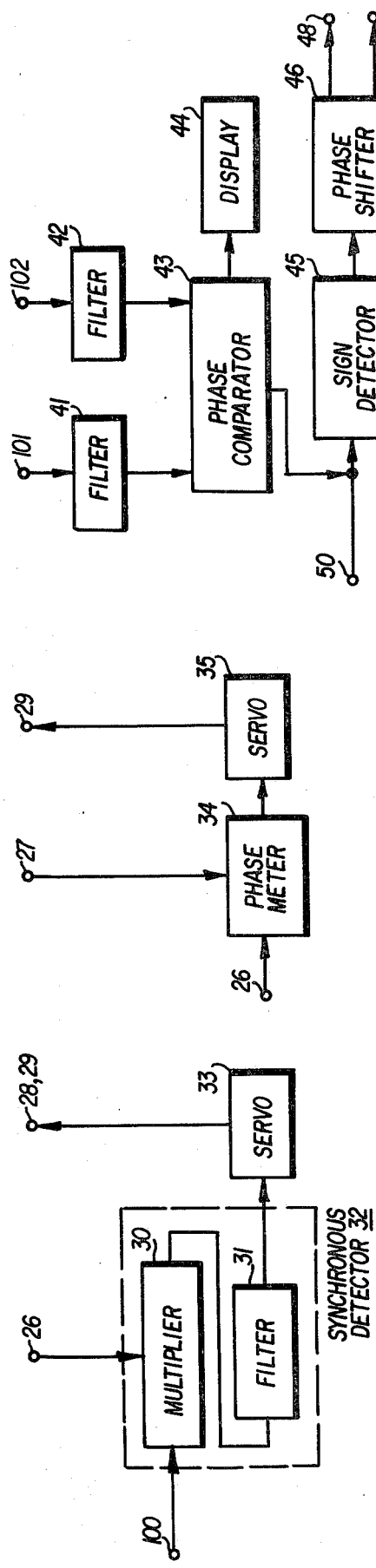
FIG. 2B
FIG. 2A
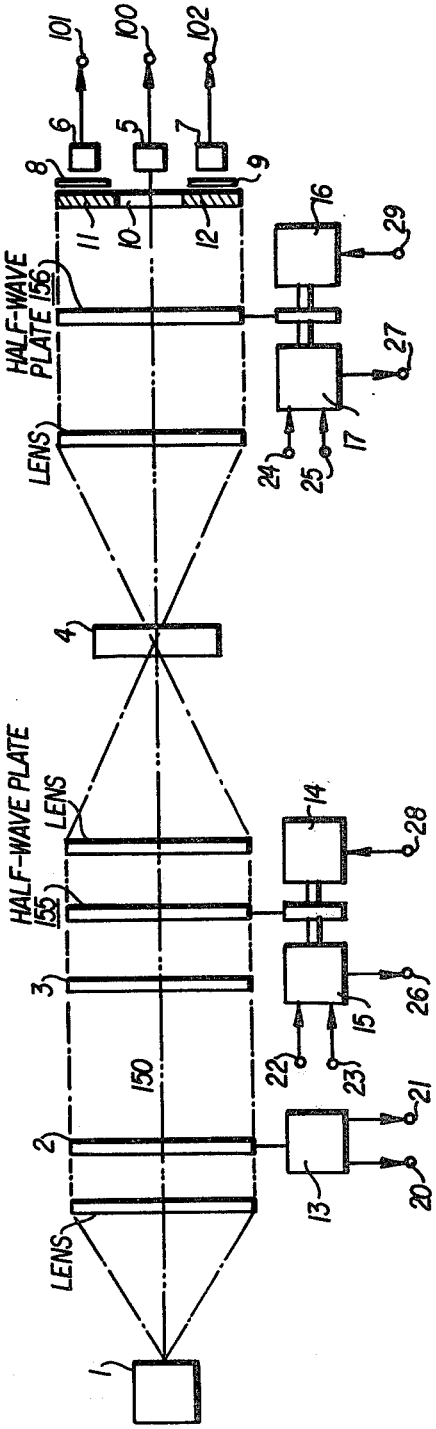
FIG. 4

AUTOMATIC TWO WAVELENGTH PHOTOELASTICIMETER

BACKGROUND OF THE INVENTION

The present invention relates to a photoelasticimeter and more particularly to a two wavelength photoelasticimeter which permits the unambiguous determination of the phase shifts which occur in a polarized light wave when the light wave is transmitted through a model.

Photoelasticimetry is the science which is directed to determining the direction of and the difference between the principal stresses of a transparent model subjected to static or dynamic stresses by determining the changes made in the polarization of an incident light wave. During the last few years, optical methods of measurement have been developed which have lead to point determination of the polarization parameters (or forms of light). In particular, various apparatus have been developed which operate automatically and employ as one of their essential components a polarizer rotating at constant speed.

Reference may be had, for instance, to U.S. Pat. No. 3,580,681 granted May 25, 1971. The apparatus disclosed in this patent makes it possible to achieve a precision of one-tenth of a degree in the measurement of the phase variations of the polarized wave. However, the phase measurements are obtained in the form of their sine function and therefore, in the general case, there is an indeterminance caused by multiples of the constant angular values, that is, there is an indeterminance of $k\pi$. Consequently, these apparatus lend themselves to entirely automatic measurements only when the maximum variations of the phase shift are less than $\pi$ radians which occur, for example, when the models are formed from poorly photoelastic transparent materials such as plexiglass or else materials under moderate stress. Under higher stresses leading to phase shifts greater than $\pi$ radian, it is not possible to measure the phase shift at a point in an entirely automatic manner. Rather, it is necessary to add to the automatic measurement a manual measurement in order to do away with the indeterminance.

One object of the present invention is to provide a completely automatic photoelasticimeter which makes it possible to do away with the $k\pi$-radian uncertainty of the prior art.

Another object of the present invention is to provide such an apparatus which is simple to manufacture and easy to use.

SUMMARY OF THE INVENTION

In order to achieve this objective as well as others, the present invention provides an automatic photoelasticimeter which permits direct measurement of the orientation of the fast axis of a birefringent medium and the measurement of double-refraction angles of high values comprising, in succession; a light source of at least two wave lengths, a polarizer rotating at a constant speed corresponding to the angular velocity, $\omega$, a quarter-wave plate having an orientation $\beta$ with respect to a reference axis and a model to be analyzed which exhibits double refraction properties, the model having a fast axis oriented at an angle $\theta$ with respect to the reference axis and a phase shift $\phi$. The light rays are directed towards first, second and third photodetectors preceded by first, second and third analyzers, respectively. The first and second analyzers have the same orientation and are preceded by optical filters which transmit frequencies corresponding to the two predetermined frequencies of the source of light. The third analyzer is oriented at an angle of $\pi/4$ radians to the first two. The quarter-wave plate has a variable orientation $\beta$. The first and second analyzers maintain the same orientation as the quarter-wave plate and the third analyzer at all times makes an angle of $\pi/4$ radians with the first two.

The quarter-wave plate is connected to a resolver which determines its orientation and supplies the signal $\cos 2(\omega t - \beta)$. This signal is used for synchronous detection of the signal coming from the third photodetector which provides a control signal for a servomotor controlling the orientation of the plate, the control signal being zero when the quarter wave plate is oriented in such a manner that its fast axis is positioned along the bisector of the axes of double refraction of the model at the point studied. Moreover, an electronic circuit is provided to establish the difference between the phases of the components of frequency $2\omega$ at the outputs of the first and second photodetectors. This difference corresponds to the difference in the phase shifts imparted by the model to light at the wave lengths $\lambda_1$ and $\lambda_2$ which the filters arranged in front of each photodetector allow to pass.

Based on the difference in the phase shifts for two wave lengths, it is clear that one can simply obtain the mean phase shift which corresponds to the difference between the principal stress indices $(N_1-N_2)$ of the model at the point in question. If one designates by $\delta$ the difference between the optical paths at one point of a model, this model having axes oriented along an angle $\theta$ with respect to a reference direction, one has, for two wave lengths designated by $\lambda_1$ and $\lambda_2$:

$$\phi_1 = 2\pi\delta/\lambda_1 \text{ and } \phi_2 = 2\pi\delta/\lambda_2.$$

For a mean wavelength one can also write $\lambda_m = \sqrt{\lambda_1 \lambda_2}$; $\phi_m = 2\pi\delta/\lambda_m$. Calling $\Delta\lambda$ the difference between $\lambda_1$ and $\lambda_2$, $\lambda_1$ being greater than $\lambda_2$, one has:

$$\phi_m = \frac{\lambda_m}{\Delta\lambda}(\phi_2 - \phi_1)$$

Thus, from the determination of $\phi_2 - \phi_1$ it is possible to obtain $\phi_m$.

Known formulas give the relationship between the difference between the principal stresses and $\phi_m$. This difference is proportional to $\phi_m$. It will be noted that the difference between the principal indices is generally designated by $N_1 - N_2$, but in this case the two indices no longer concern two separate wavelengths and what is of interest here is the difference between the stresses for a given wavelength, for instance $\phi_m$.

DESCRIPTION OF THE DRAWINGS

The objects, characteristics, and advantages of the present invention will be explained in further detail in the following description of specific embodiments, read in conjunction with the accompanying drawings in which:

FIG. 2A shows in block form an example of a tracking circuit for positioning the orientable quarter-wave plates of FIGS. 1A and 1B;

FIG. 2B shows in block form an embodiment of a tracking circuit for the polarizers shown in FIGS. 1A and 1B, FIG. 3 shows in block form an electronic circuit used in the present invention, and FIG. 4 is a block diagram of another embodiment of the invention.

DETAILED DESCRIPTION OF THE INVENTION

Figure 1A:
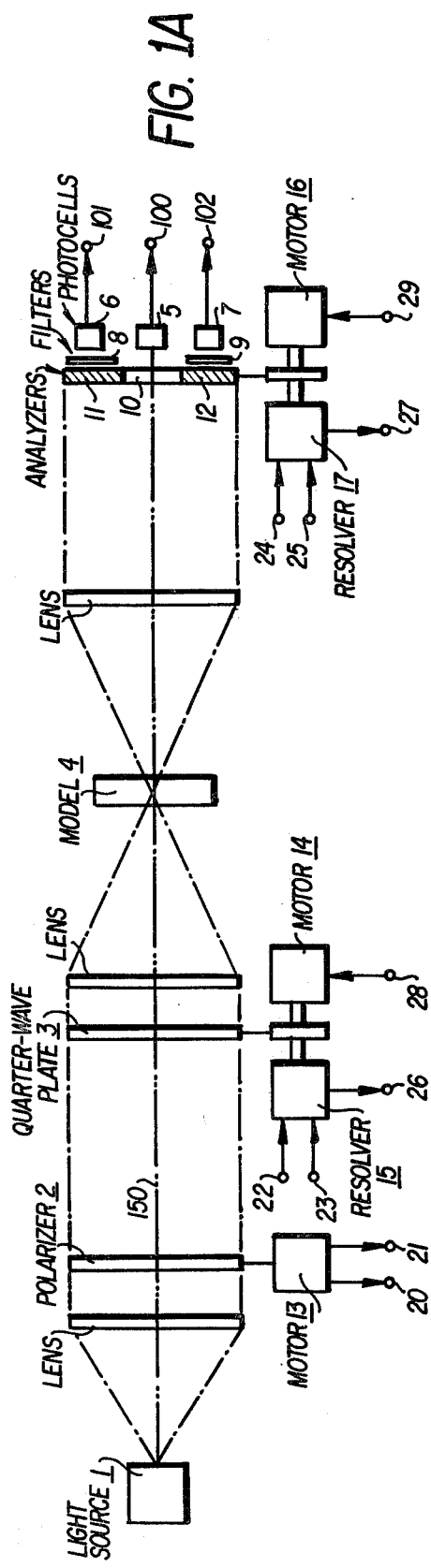
FIGS. 1A and 1B show diagrammatically the optical and mechanical components comprising two embodiments of the apparatus in accordance with the present invention.
Figure 1B:
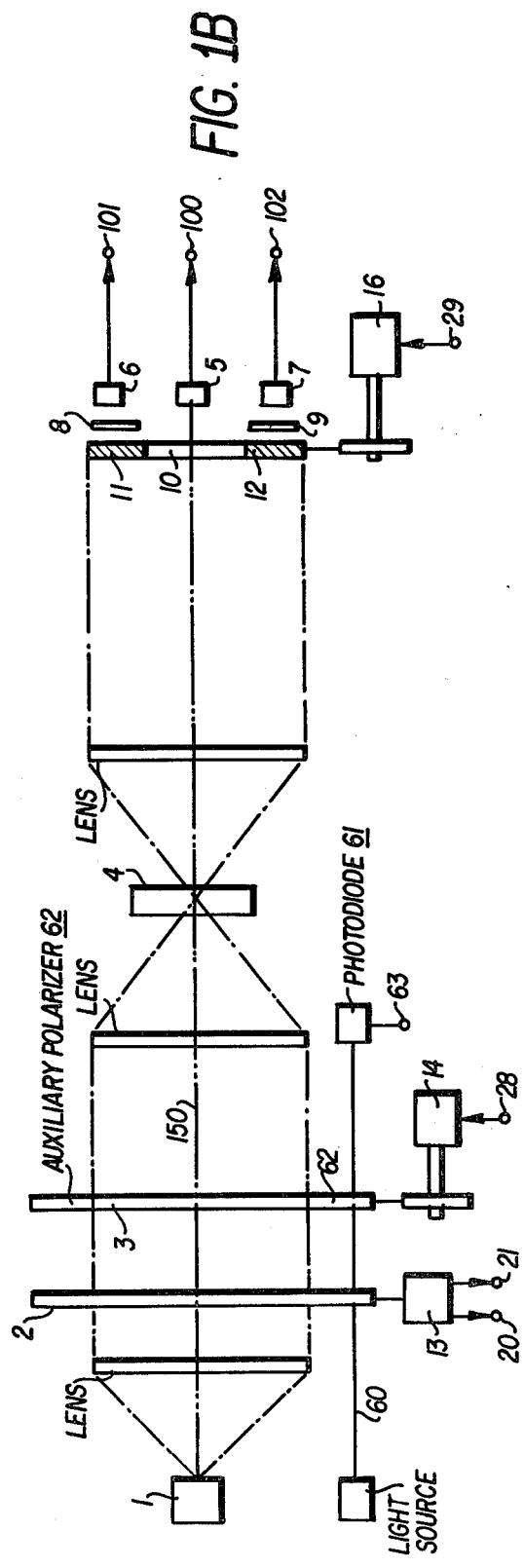

FIGS. 1A and 1B show diagrammatically the principal optical and mechanical components of the present invention. A source of light 1 emits a spectrum comprising at least two wavelengths $\lambda_1$ and $\lambda_2$. The rays emitted by the source 1 pass in succession through a polarizer 2, a quarter wave plate 3, the model to be studied 4 and then strike against three photodetector cells 5, 6 and 7 which may be semiconductor cells or photomultipliers. The cell 6 is preceded by a filter 8 which passes the first wavelength $\lambda_1$ and the cell 7 by a filter 9 which passes the second wavelength $\lambda_2$. Furthermore, each of the cells is preceded by a polarization element. 10 designates the polarization element preceding the cell 5, 11 the polarizer preceding the cell 6 and 12 the polarizer preceding the cell 7. It will be noted that it is conventional in polarimetry to term the last of the polarizers encountered on an optical path, the analyzer; thus, the polarizers 10, 11 and 12 may be called analyzers.

The polarization orientation of analyzers 11 and 12 corresponds to the orientation of the fast axis of quarter-wave plate 3, and the polarization orientation of analyzer 10 is displaced $\pi/4$ radians from that of analyzers 11 and 12. Analyzers 11 and 12 can be formed of one and the same ring-shaped element with the analyzer 10 fixed in the central portion of this ring. The assembly of analyzers 10, 11 and 12 may also consist of a single polarizer sheet having at its center a disc comprising a half-wave plate.

Lens elements L are included in the optical path to assure the necessary optical conjugations. Of course, other methods of optical conjugation can be selected and, in particular, if the source of light is a laser emitting two wavelengths, the conjugations will be distinct. The initial adjustment of the polarizers with respect to the quarter-wave plate 3 is effected in the absence of the model 4.

Polarizer 2 is connected to a motor 13 which rotates the polarizer at a constant speed with an angular frequency $\omega$ about the longitudinal axis 150 of the optical system. The quarter-wave plate 3 is connected to a servomotor 14 which makes it possible to orient its fast axis along the bisector of the axes of double refraction of the model 4 at the point where it is traversed by the beam of light, as will be explained hereinafter. The orientation of the quarter-wave plate 3 is determined by a resolver 15 connected to the shaft of the motor 14. The assembly of polarizers 10, 11 and 12 is controlled so that the polarizers 11 and 12 retain the same orientation $\beta$ as the fast axis of the quarter-wave plate 3. This can be effected by a direct mechanical coupling or, as shown in FIG. 1A and 1B, by connecting the polarizers to a servomotor 16 which receives the same control signal as the motor 14. A device such as a resolver 17 makes it possible to determine the orientation of the polarizers at any moment.

In FIG. 1A, output signals $\cos 2\omega t$ and $\sin 2\omega t$, which are obtained from the constant speed motor 13, are generated at terminals 20 and 21, respectively. These signals can, for instance, be obtained as outputs of a photoelectric cell receiving light from markers on the axis of the motor 13 or by any other conventional means. Outputs 20 and 21 are coupled to the respective inputs 22, 23 and 24, 25 of resolvers 15 and 17. One thus obtains at terminal 26 of resolver 15 a signal having the form $\cos 2(\omega t - \beta)$ and an analogous signal at the output 27 of the resolver 17.

The reference numbers 28 and 29 designate the control inputs of the motors 14 and 16 which receive the same control signal. The numerals 100, 101, and 102 designate the outputs of the photodetectors 5, 6 and 7 respectively.

FIG. 2A shows an embodiment, given by way of example, of an electronic circuit which makes it possible to control the motor 14 for orientation of the quarter-wave plate 3. This electronic circuit comprises a multiplier 30 and a continuous component filter 31 which together constitute a synchronous detection device 32. The multiplier receives the output $\cos 2(\omega t - \beta)$ at terminal 26 of the resolver 15 and the output 100 of photodetector 5. One thus obtains at the output of the synchronous detection device 32 a signal proportional to $\sin 4 (\propto - \theta)$, where $\theta$ is the orientation of the fast axis of double refraction of the sample 4 at the point in question and $\beta$ is the orientation of the major axis of the quarter-wave plate 3, as explained previously. Thus the output of the synchronous detector 32 becomes zero when $4(\theta - \beta) = \pi$; that is, when $\theta = \beta + \epsilon\pi/4$, $\epsilon$ being equal to $\pm 1$. This signal is coupled to a servocontrol circuit 33 which applies the same control signal to the terminals 28 and 29 only when $\theta$ is different from $\beta + \epsilon\pi/4$. The desired adjustment of the quarter-wave plate 3 is thereby obtained, the major axis of plate 3 then being parallel to the bisector of the axes of double refraction of the sample at the point in question.

As has been previously seen, in the device according to the present invention, the group of analyzers 10, 11 and 12 is oriented in accordance with a given predetermined relationship with respect to the major axis of the quarter-wave plate 3. This can be effected by mechanically coupling the quarter-wave plate and the assembly of analyzers or, as has been shown in FIG. 1A, by using two motors 14 and 16 receiving the same control signal in order to simultaneously to orient the quarter-wave plate 3 and the polarizers 10 and 12. Alternatively, one can employ a control circuit such as that shown in FIG. 2B. This control circuit comprises a phase meter 34 which receives the output signal 27 of the receiver 17 in the form $\sin(2\omega t - \beta)$, and the output signal 26 of the resolver 15 in the form $\cos (2\omega t - \beta)$. The output of this phase meter will then be sent to a servo device 35 which applies a control signal to the terminal 29 of motor 16, as long as the difference in phase between the signals coming from the terminals 26 and 27 is different from $\pi/2$ radians. In this case, the two motors 14 and 16 are controlled individually.

Another embodiment of the invention is shown in FIG. 1B in which signals of the form $\cos 2(\omega t - \beta)$ or $\sin 2(\omega t - \beta)$ can also be obtained by sending to the rotating analyzer 2 a light beam 60 which arrives at a photodetector 61 preceded by a polarizer 62 having a rotation related to that of the quarter-wave plate 3. The initial orientation of the polarizer 62 makes it possible to obtain a signal 63 of $\cos 2(\omega t - \beta)$ of $\sin 2(\omega t - \beta)$. The resolvers 15 and 17 of the embodiment shown in FIG. 1A can then be eliminated and the signal 63 employed instead of the signal 26 of FIG. 2B.

It will be noted that one of the parameters of the model at the point in question has been obtained, namely the orientation of the axes of double refraction, since the angle $\beta$ can be determined. Nevertheless an uncertainty remains at this stage relating to the positive or negative sign of $\epsilon$. It will be shown below how this uncertainty can be removed.

FIG. 3 shows an electronic phase measurement circuit. It will be assumed in the description of the operation of this circuit that the quarter-wave plate and the polarizers are suitably controlled so that $\theta = \beta + \epsilon\pi/4$.

The output 101 and 102 of the photodetectors 6 and 7 respectively are connected to the input of circuits 41 and 42 having the function of filtering the component with a frequency of $2\omega$; that is, twice the frequency of rotation of the rotating polarizer of constant angular velocity $\omega$ and of amplifying these signals. The pulsation components of $2\omega$ are $E_1$ and $E_2$ at the outputs of the photodetectors 6 and 7 with $$E_1 = \frac{E_o}{2} \cos[2(\omega t - \beta) - \epsilon \phi_1]$$

$$E_2 = \frac{E_o}{2} \cos[2(\omega t - \beta) - \epsilon \phi_2]$$

In these formulas, $E_o$ is a variable proportional to the intensity of illumination of the source of light, $\phi_1$ is the phase shift produced by the model 4 to be studied for the wavelength $\lambda_1$, and $\phi_2$ is the phase shift contributed for the wavelenth $\lambda_2$. The outputs of the circuits 41 and 42 are sent to a phase comparator circuit 43 of known type which determines the phase shift between the two signals $E_1$ and $E_2$; that is, the quantity $\epsilon(\phi_2 - \phi_1)$. Circuit 43 makes it possible to supply this quantity in numerical form to a display circuit 44. It will be noted that the sign of $\phi_2 - \phi_1$ is predetermined as a function of the relative values of the wavelengths $\lambda_2$ and $\lambda_1$. The display circuit 44 therefore supplies only the absolute value of $\phi_2 - \phi_1$.

One output of the device 43 is also coupled to a sign detector 45 which controls a phase-shifting circuit 46. The phase-shifting circuit 46 receives the output of a phase difference device 47 whose input terminals receive signals from terminals 20 and 26; that is cos $2\omega t$ and cos $2(\omega t - \beta)$. The value of $\beta$ obtained at the output of the phase difference circuit 47 is modified by the phase-shifting circuit 46 in such a manner as to obtain at the output of circuit 46 a signal $\theta = \beta + \pi/4$ at a terminal 48 or a signal $\theta = \beta - \pi/4$ at a terminal 49, depending on the sign of $\epsilon$ detected by the sign detector 45. Of course, the outputs 48 and 49 can be connected to a numerical display device, to a curve plotter, or to any other visualization and/or recording means.

The objects of the present invention, as set forth above, have therefore been reached, namely a measurement of the difference of the phase shifts for two wavelengths ($\phi_2 - \phi_1$) at a display circuit 44, and the orientation $\theta$ of the sample studied at the terminal 48 or at the terminal 49.

The output $\phi_2 - \phi_1$ of the circuit 43 can also be coupled to a terminal 50 which is followed by a multiplier (not shown) which multiplies the output of phase comparator 43 by a constant coefficient characteristic of the photoelastic coefficients of the model. The difference between the stresses $N_1 - N_2$ will then be directly obtained at the output of the multiplier, as has been set forth previously.

In the foregoing description, there has been described the use of the output signals of the $2\omega$ frequency filter and amplification means 41 and 42 to generate the difference between the phases of these signals in order to obtain the difference between the phase shifts contributed by the model to the two wavelengths considered. It is also possible to obtain directly, from these outputs, the values of $\phi_1$ and $\phi_2$ by effecting synchronous detection by means of the signal cos $2(\omega t - \beta)$ available at the terminal 26. Synchronous detection of the output of the circuit 41 supplies $\epsilon\phi_1$ and synchronous detection of the output of the circuit 42 supplies $\epsilon\phi_2$. This embodiment can be useful when the values of $\phi_1$ and of $\phi_2$ are small and the difference $\phi_1 - \phi_2$ is very small. It will be noted that based on the sign of $\epsilon\phi_1$ or $\epsilon\phi_2$ one can use the sign detector 45 and do away with uncertainty as to the value of $\theta$, as has been explained above.

The connection described above can be modified to obtain the phase shift and the orientation of the fast axis directly, as will be explained hereinafter.

In the embodiment of the invention shown in FIG. 4, the quarter-wave plate 3 and the assembly of analyzers 10, 11, and 12 placed in front of the three photodetectors 5, 6 and 7 are stationary and two achromatic half-wave plates 155 and 156 are placed in front of and behind the model; that is, between the quarter wave plate 3 and the model and between the model and the analyzers 10, 11 and 12 respectively.

In this arrangement, the quarter-wave plate 3 is fixed as are the analyzers 10, 11 and 12, the motors 14 and 16 rotating the half-wave plates 155 and 156.

The reference direction is that of the fast axis of the quarter-wave plate 3. The polarizers 11 and 12, as previously, are oriented along the fast axis of the quarter-wave plate 3 and the polarizer 10 receives white light along one of the bisectors of the axes of the quarter-wave plate.

If the orientation of the fast axes of the two acromatic half-wave plates 155 and 156 is designated by $\gamma$, multiplying the alternating portion of the signal received at the photodetector 5 by cos$2\omega t$ and filtering of the continuous signal produces an error voltage proportional to $$\sin(8\gamma - 4\theta)[1 - \cos\phi].$$

It is possible to select a position of the follow up such that $8\gamma - 4\theta = \pi + 2 k \pi$ and $2\theta = \epsilon(\pi/2) + k\pi$, where $\epsilon = \pm 1$.

The alternating parts of the signals received by the photodetectors 6 and 7 are:
cos $\phi_1$ cos $2\omega t$ + $\epsilon$sin $\phi_1$ sin $2\omega t$ = cos $(2107\ t - \epsilon\phi_1)$
cos $\phi_2$ cos $2\omega t$ + $\epsilon$sin $\phi_2$ sin $2\omega t$ − $\epsilon\phi_2$)
The phase difference between 6 and 7 is $$\epsilon(\phi_2 - \phi_1),$$

Determination of the phase difference makes it possible to determine $\epsilon$ and hence $\theta$ to an accuracy of $\pi$.

As in the preceding arrangement, one can determine at each point, the difference in stresses as a function of $\phi_2 - _1$ and the orientation of the fast axis.

PRECISION OF THE MEASUREMENTS

The overall operation of the apparatus of the present invention has been described above. It should be emphasized that this apparatus makes it possible to measure $\phi_2 - \phi_1$ with great precision. Further, the optical device is very simple, which avoids possible depolarization problems. One of the problems encountered in making polarization measurements with different wavelengths is that, if the polarizers operate over a relatively wide range of frequencies, the quarter-wave plates generally operate only within a small region of wavelengths. Thus, the quarter-wave plate will not supply the same phase shift of $\pi/2$ for the wavelengths $\lambda_1$ and $\lambda_2$ as was assumed by way of simplification in the preceding calculations of the values of $E_1$ and $E_2$. As a matter of fact, the quarter-wave plate will supply a phase shift $\Phi_1$ for the wavelength $\lambda_1$ and a phase shift $\Phi_2$ for the wavelength $\lambda_2$.

One therefore has:

$E_1 = (Eo/2) [\cos 2(\omega t - \beta) + \sin \Phi_1 \sin \phi_1 \sin 2(\omega t - \beta)]$ $E_2 = (Eo/2) [\cos \phi_2 \cos 2(\omega t - \beta) + \sin \Phi_2 \sin 2(\omega t - \beta)]$ with $\Phi_1$ 32 $\pi/2 - \pi$ and $\Phi_2 - \pi/2 + \eta$.

The result is, upon placing the above equations in the same form as the previous equations for $E_1$ and $E_2$, that $\phi_1$ is replaced by $\phi_1 +$ an error $\mu_1$, and $\phi_2$ is replaced by $\phi_2 +$ an error $\mu_2$. As a matter of fact, one can determine that $\mu$ is equal to $(\pi/4)(\Delta\lambda/\lambda m)$, $\Delta\lambda$ and $\lambda_m$ having been previously defined. One thus obtains a maximum error for the value of $\phi_2 - \phi_1$, $d\phi$ such that:

$$d\phi = \frac{\pi^2}{32} \frac{\Delta\lambda}{\lambda m}$$

By selecting the wavelengths $\lambda_1$ and $\lambda_2$ corresponding to the yellow and green rays of a high pressure mercury vapor lamp (HB 9200), $\lambda_1$ equals 0.579 micron and $\lambda_2$ equals 0.546 micron. One then has a fringe order error which is less than $10^{-3}$.

It will therefore be noted that the device in accordance with the present invention makes it possible to obtain excellent precision even when using two different wave lengths for which the quarter-wave plate is not perfectly suitable.

Furthermore, a difference of a few degrees in relative orientation of the polarizer 10 and of the polarizers 11 and 12 with respect to the orientation of $\pi/4$ radians does not affect control of the quarter-wave plate 3.

Another advantage of the present invention resides in the fact that no measurement of intensities of luminous signals or of corresponding electric signals is effected, but only phase measurement. The result is that variations in intensity of the source of light, whether absolute or relative, do not affect the values measured.

OPERATING RANGE

It has been previously stated that the present invention makes it possible to measure differences in phase shift for two different wavelengths, which phase shifts may be individually greater than $\pi$. The fact nevertheless remains that the difference between the phase shifts for the two different wavelengths, that is $\phi_1 - \phi_2$, must remain less than $\pi$ so that there will be no indeterminance in the measurement. This difference may be expressed as a function of the difference in the optical path $\delta$ along the two axes in the following manner:

$\phi_2 - \phi_1 = 2\pi\delta \left( \frac{1}{\lambda_2} - \frac{1}{\lambda_1} \right).$ In the case of the preceding numerical example ($\lambda_1 = 0.579\mu$ and $\lambda_2 = 0.546\mu$) one finds that the apparatus permits the measurement without indeterminance as long as the fringe order for the mean wavelength is less than 8.5. This makes it possible to solve most practical cases. Nevertheless, one can, by bringing closer together the incident wavelengths, obtain a larger operating range.

The person skilled in the art will note that the apparatus in accordance with the present invention is subject to numerous variants. Instead of using a single source of light one may, for instance, use two distinct sources of light the beams of which are mixed; by suitably modifying the electronic circuits one may also use pulsed light sources which alternately send out a pulse at a first wavelength and a pulse at a second wavelength. This makes it possible to provide a larger selection of initial wavelengths. Finally, it will be noted that the particular methods of follow up described for the orientation of the quarter-wave plate 3, and the analyzers 10, 11 and 12 have been given solely by way of example and that any other method of follow up furnishing the same result can be employed. For example, an orientation of the axexs of the quarter-wave plate 3 parallel to the bisectors of the axes of the model at the point in question can be used.

The present invention is not limited to the embodiments which have just been described; rather, it is capable of variations and modifications which will be evident to the person skilled in the art.

We claim:

1. An automatic photoelasticimeter for analyzing a model having a fast-axis of double refraction at a predetermined point oriented at an angle $\theta$ with respect to a reference axis, said model producing a phase shift $\phi$ in the light being transmitted therethrough, said photoelasticimeter comprising in succession along a longitudinal axis:

a light source emitting light having at least first and second wavelengths;

a polarizer rotating at a constant speed $\omega$;

a quarter-wave plate having a fast axis oriented at an angle $\beta$ with respect to said reference axis;

said model, first, second and third analyzers;

first and second filters for transmitting light at said first and second wavelengths respectively;

first, second and third photodetectors, said first photodetector receiving light transmitted through said first analyzer and said first filter and said second photodetector receiving light transmitted through said second analyzer and said second filter, said third photodetector receiving light transmitted only through said third analyzer;

means for orienting said quarter-wave plate along the bisectors of the axes of double refraction of said model at said predetermined point, means for orienting said first and second analyzers parallel to the fast axis of said quarter-wave plate and said third analyzer along an angle displaced $\pi/4$ radians with respect to said first and second analyzers; and means coupled to the outputs of said first and second photodetectors for obtaining the algebraic difference between the phases of the components of frequency 2ω appearing at the outputs of said first and second photodetectors, said phase difference corresponding to the shift φ caused by the birefringence of said model at said predetermined point, the angle φ of the fast axis of double refraction of said model being a function of the sign of said phase differences and the angle β of the fast axis of said quarter-wave plate.

2. The automatic photoelasticimeter defined by claim 1 wherein said means for orienting said quarter-wave plate comprises:
   a servomotor coupled to said quarter-wave plate for rotation thereof;
   means for generating reference signals corresponding to cos 2ωt and sin 2ωt;
   a resolver connected to said means for generating said reference signals and coupled to said quarter-wave plate for generating a signal cos 2(ωt−β);
   a synchronous detector coupled to the outputs of said third photodetector and said resolver; and
   servocontrol means coupled to the output of said synchronous detector, the output of said synchronous detector being minimum when θ=β±π/4.

3. The automatic photoelasticimeter defined by claim 1 wherein said first, second and thrd analyzers are formed of an annular polarizer element for transmitting beams from said light source to said first and second photodetectors, and of a circular central polarizer element oriented at 45° with respect to said annular polarizer, said central polarizer element transmitting a beam from said light source to said third photodetector.

4. The automatic photoelasticimeter defined by claim 1 wherein said means for orienting said quarter-wave plate comprises an auxiliary polarizer coupled to said quarter-wave plate, and a photodiode, said photodiode generating an output signal corresponding to cos 2(ωt−β) when light impinges thereon after being transmitted through said polarizer and said auxiliary polarizer.

5. An automatic photoelasticimeter for analyzing a model having a fast-axis of double refraction at a predetermined point oriented at an angle with respect to a reference axis, said model producing a phase shift φ in the light being transmitted therethrough, said photoelasticimeter comprising in succession along a longitudinal axis:
   a light source emitting light having at least first and second wavelengths;
   a polarizer rotating at a constant speed ω;
   a stationary quarter-wave plate having a fast axis oriented at an angle β with respect to said reference axis;
   a first acromatic half-wave plate,
   said model,
   a second acromatic half-wave plate,
   first, second and third stationary analyzers,
   first and second filters for transmitting light at said first and second wavelengths respectively;
   first, second and third photodetectors, said first photodetector receiving light transmitted through said first analyzer and said first filter and said second photodetector receiving light transmitted through said second analyzer and said second filter, said third photodetector receiving light transmitted only through said third analyzer;
   means for orienting the fast axes of said first and second achromatic half-wave plates, and
   means coupled to the outputs of said first and second photodetectors for obtaining the algebraic difference between the phases of the components of frequency 2ω appearing at the outputs of said first and second photodetectors, said phase difference corresponding to the shift φ caused by the birefringence of said model at said predetermined point, the angle θ of the fast axis of double refraction of said model being a function of the sign of said phase difference and the angle β of the fast axis of said quarter-wave plate.

* * * * *